(12) United States Patent
Arensmeier

(10) Patent No.: US 10,712,039 B2
(45) Date of Patent: Jul. 14, 2020

(54) SYSTEM AND METHOD FOR DEMAND MITIGATION OF COMMONLY SCHEDULED THERMOSTATS

(71) Applicant: Emerson Electric Co., St. Louis, MO (US)

(72) Inventor: Jeffrey N. Arensmeier, Fenton, MO (US)

(73) Assignee: Emerson Electronics Co., St. Louis, MO (US)

( * ) Notice: Subject to any disclaimer, the term of this patent is extended or adjusted under 35 U.S.C. 154(b) by 45 days.

(21) Appl. No.: 16/156,667

(22) Filed: Oct. 10, 2018

(65) Prior Publication Data

US 2020/0116379 A1    Apr. 16, 2020

(51) Int. Cl.
*F24F 11/63* (2018.01)
*G05B 19/042* (2006.01)
*F24F 110/12* (2018.01)

(52) U.S. Cl.
CPC ............ *F24F 11/63* (2018.01); *G05B 19/042* (2013.01); *F24F 2110/12* (2018.01); *G05B 2219/25257* (2013.01)

(58) Field of Classification Search
None
See application file for complete search history.

(56) References Cited

U.S. PATENT DOCUMENTS

| | | | |
|---|---|---|---|
| 6,480,803 B1 | 11/2002 | Pierret et al. | |
| 7,809,472 B1 | 10/2010 | Silva et al. | |
| 8,972,065 B2* | 3/2015 | Matsuoka | G05B 15/02 700/277 |
| 8,977,399 B2 | 3/2015 | Stachler et al. | |
| 2005/0144963 A1* | 7/2005 | Peterson | F24F 11/0001 62/178 |
| 2008/0272934 A1* | 11/2008 | Wang | H02J 3/14 340/870.11 |
| 2013/0211615 A1 | 8/2013 | Zikes et al. | |
| 2015/0142181 A1 | 5/2015 | Stachler et al. | |
| 2017/0234562 A1* | 8/2017 | Ribbich | G05D 23/1923 700/277 |
| 2020/0073419 A1* | 3/2020 | Pickard | G05D 23/1917 |

* cited by examiner

*Primary Examiner* — Ryan A Jarrett
(74) *Attorney, Agent, or Firm* — Armstrong Teasdale LLP

(57) ABSTRACT

A method and a thermostat for a multi-thermostat temperature control system are provided. The system includes a thermostat including at least one processor communicatively coupled to at least one memory device. The thermostat is configured to receive one or more input signal commands permitting a recovery from a demand management system load shedding event and determine a pseudo-random starting time window from which a recovery starting time is selected. The pseudo-random starting time is based on a value accessible to the thermostat that is unique to the thermostat. The starting time window includes a primary delay window and a secondary delay window within the primary delay window. The thermostat is also configured to start an operation of a conditioning unit associated with the thermostat at the selected time.

19 Claims, 15 Drawing Sheets

SYSTEM AND METHOD FOR DEMAND MITIGATION OF COMMONLY SCHEDULED THERMOSTATS

FIELD

The field of the disclosure relates generally to environmental control systems, and, more particularly, to managing operation of a plurality of independently operating environmental conditioning equipment.

BACKGROUND

In addition to billing customers for an amount of electrical power usage, utilities and other energy providers, bill customers based on the customer peak demand. The cost can be significant, for example, approximately $2.00/kw of total demand per month. Usually the peak rate is held for a period of time, for example, thirteen months or until a higher peak is set, which is then held for thirteen months or other period specified by regulation. The peak demand charge can be significant, as much as several thousand dollars, and is intended to encourage customers to manage their peak demand.

Although not always appreciated, simultaneous HVAC equipment start can be a major contributor to a building's peak demand. Starting currents for electric motors may be six to eight times normally running currents and when the HVAC equipment restarts it may run at full load for a significant period of time as it attempts to recover the environmental conditions in areas it serves. The potentially large number of equipment being started nearly simultaneously, the high starting currents associated with the starts, and the fully loaded condition of the HVAC equipment for a period of time after starting all contribute to a high peak demand. Reducing the peak demand will reduce the peak demand component of electrical energy supply costs. A simultaneous start of HVAC equipment is likely to occur during a recovery from a demand load shedding event. Energy suppliers may have prearrangements with customers during peak electrical demand periods to reduce energy demand by commanding large loads offline or, in the case of HVAC equipment, raising a temperature setpoint in what may be referred to a demand load shedding event. When the need for the lower electrical demand passes, the energy supplier may rescind the demand load shedding event by transmitting a recovery from load shedding command, at which time the customers are free to restart their equipment. If all the equipment was started at the same time, large demand would occur, which could obligate the customer to the higher peak demand charge Large scale demand management systems require considerable expenditure of funds and are not often deployed in smaller or medium scale properties, for example, a school or hospital campus with numerous buildings, with each building potentially having numerous environmentally controlled zones, each having its own thermostat.

In traditional energy management systems staggered starts are accomplished by a variety of means, typical using knowledge of real time total demand, each system's demand and conditions in each served space. Typically, these systems manage demand based on real-time system wide monitoring and control. These implementations use a full and deep knowledge of the system's components and their state to accomplish precise demand management. This requires a considerable amount of instrumentation, configuration, and expense.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a thermostat for a multi-thermostat temperature control system includes a load shedding event recovery controller, a processor coupled to at least one memory device. The load shedding event recovery controller is configured to receive one or more input signal commands permitting a recovery from a demand management system load shedding event and to determine a pseudo-random starting time window from which a recovery starting time is selected. The pseudo-random starting time is based on a value accessible to the thermostat that is unique to the thermostat. The starting time window includes a primary delay window and a secondary delay window within the primary delay window. The load shedding event recovery controller is also configured to start an operation of a conditioning unit associated with the thermostat at the selected time.

In another embodiment, a method of managing a recovery of a plurality of independent autonomous conditioning units from a load shedding event includes receiving, by each of the thermostat devices, a load shedding recovery notification, selecting, by each thermostat device, a value that is unique to the thermostat device, retrieving, from a memory of the thermostat device, a first time period value, retrieving, from the memory of the thermostat device, a second time period value, and pseudo-randomly generating a primary time delay window using the selected unique value, the retrieved first time period value, and a first selectable set of randomization rules from a plurality of sets of randomization rules. The method also includes pseudo-randomly generating a secondary time delay window within the primary time delay window using the selected unique value, the retrieved second time period value, and a second selectable set of randomization rules from a plurality of sets of randomization rules, the first and second selectable sets of randomization rules are at least one of the same and different and restarting each of the plurality of independent autonomous conditioning units at a starting time that is delayed from the receipt of the load shedding recovery notification by an amount defined by the secondary time delay window.

In yet another embodiment, a temperature control system includes a plurality of independent autonomous thermostats. Each thermostat includes at least one processor communicatively coupled to at least one memory device. The plurality of independent autonomous thermostats are configured to receive one or more input signal commands permitting a recovery from a demand management system load shedding event and determine, by each of the plurality of independent autonomous thermostats, a pseudo-random starting time window from which a recovery starting time for that thermostat is selected, the pseudo-randomization based on a value accessible to the thermostat that is unique to the thermostat, the starting time window including a primary delay window and a secondary delay window within the primary delay window. The thermostats are also configured to start an operation of a conditioning unit associated with the thermostat at the selected time.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

Figure 1:
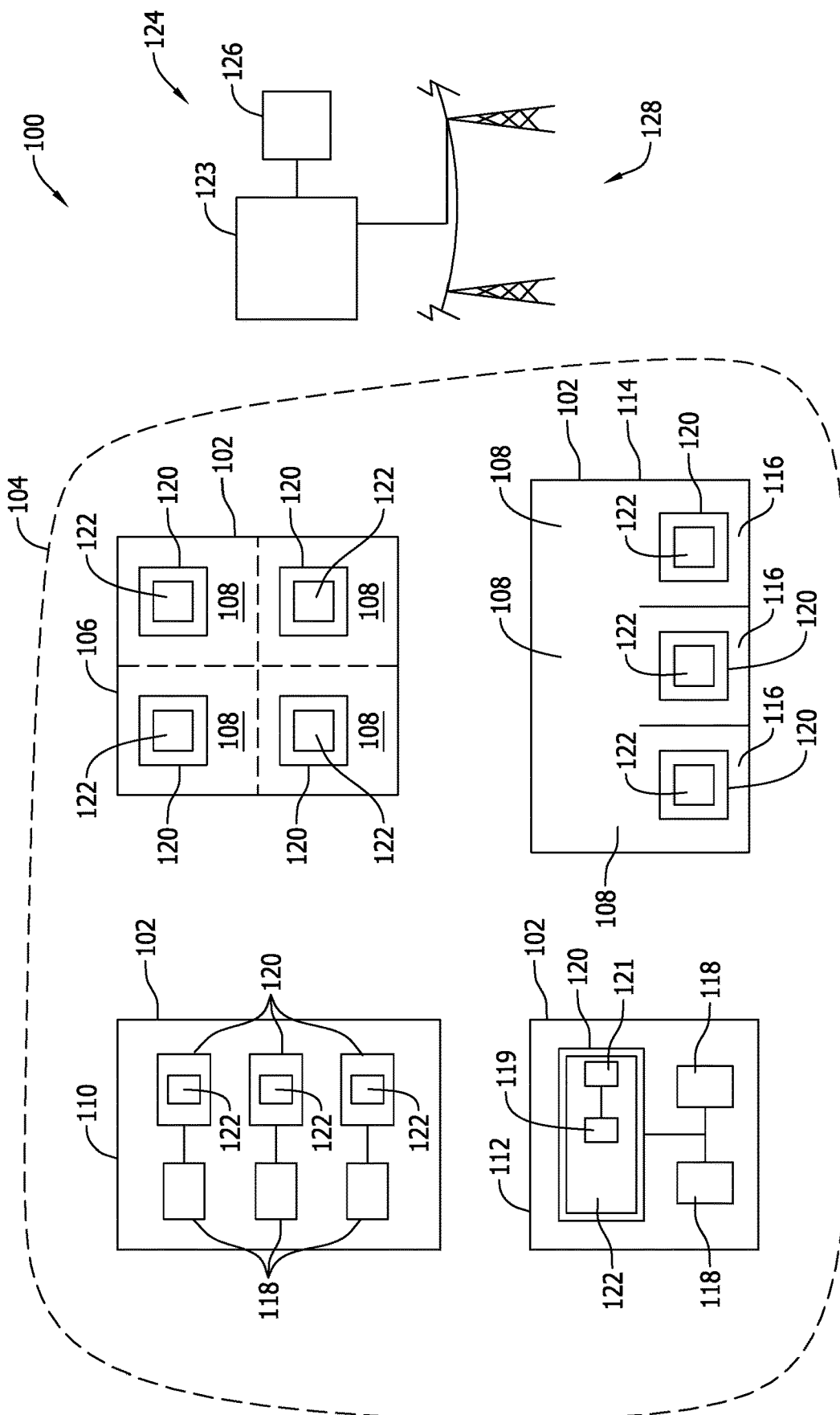
FIG. 1 is a schematic block diagram of a multi-thermostat temperature control system in accordance with an example embodiment of the present disclosure.

Although specific features of various embodiments may be shown in some drawings and not in others, this is for convenience only. Corresponding reference characters indicate corresponding parts throughout the drawings. Any feature of any drawing may be referenced and/or claimed in combination with any feature of any other drawing.

Unless otherwise indicated, the drawings herein are meant to illustrate features of embodiments of the disclosure. These features are applicable in a wide variety of systems including embodiments of the disclosure. As such, the drawings may not include all conventional features known by those of ordinary skill in the art to be required for the practice of the embodiments disclosed.

DETAILED DESCRIPTION

The following detailed description illustrates embodiments of the disclosure by way of example and not by way of limitation. It is contemplated that the disclosure has general application to analytical and methodical embodiments of managing temperature control systems in industrial, commercial, and residential applications.

Embodiments of a thermostat for use with a peak demand management system are described herein. Prior art systems may include a central server or a thermostat controller that communicates with a plurality of thermostats associated with a single rate-paying entity, such as, a school, hospital, or manufacturing facility. In such systems, with large numbers of thermostats, coordination between thermostats may be possible through the central server, the thermostat controller, or peer-to-peer.

Rate-paying entities that have lesser numbers of thermostats may not realize enough benefit from the central server or the thermostat controller management systems to warrant its installation or retrofit. In such cases, example thermostats described herein provide a peak demand management system wherein each thermostat and the HVAC unit controlled by it operate independently from any other thermostat, but the plurality of thermostats are still able to provide staggered start features that reduce peak demand during a load shedding event recovery. That is, each thermostat is configured to start its associated HVAC unit in a random or pseudo-random time period that eliminates or greatly reduces the incidence of simultaneous starting of a plurality of the HVAC units.

Algorithms and implementations that avoid simultaneous starting of independent thermostats that do not have any knowledge of the other thermostats in the HVAC system are described herein. The methods described herein provide staggered starting of a plurality of thermostats that are not necessarily connected or communicatively coupled, and that operate independently from one another. When a load shedding recovery signal is received by the plurality of thermostats, each thermostat independently determines one or more algorithms to use to determine a starting time and starting method for the load shedding recovery. The determination of the one or more algorithms to use may be influenced by any parameter available to a processor of the thermostat. For example, one or a combination of a plurality of parameters associated with the thermostat could be used to seed a random or pseudo-random determination of the load shedding recovery starting time. As used herein, "pseudo-random" refers to numbers within a particular range of values generated by a processing device. The pseudo-random numbers may be generated in a repeatable sequence or may be truly random, for example, based on an asynchronous counter on a least significant digit voltage measurement of the system. The pseudo-random determination is then a determination based on random or pseudo-random numbers. The determination of the starting method may include iteratively raising the setpoint of the thermostat to a pre-load shedding event value, or returning the setpoint the pre-load shedding event value in a single step. Parameters, such as, a cycle time of the associated HVAC unit determined by the thermostat may be used to prioritize the load shedding recovery starting time for that thermostat.

Referring to FIG. 1, multi-thermostat temperature control system 100 is configured to and is operative to control temperatures in one or more structures 102 of a campus 104 of a plurality of structures 102 controlled by a single rate-paying entity. One or more structures 102 may include single room structures 106 having a plurality of conditioned zones 108, single room structures 110 without distinct conditioned zones 108, single room structures 112 having a single conditioned zone 108, and multi-room structures 114 having one or more conditioned rooms 116 and/or zones 108, and combinations thereof. A temperature in one or more structures 102 is maintained by one or more conditioning units 118, which may supply heat or cooling to the one or more conditioned rooms 116 and zones 108 when demanded by an associated thermostat 120 of multi-thermostat temperature control system 100. In the example embodiment, thermostats 120 are associated with a demand management program whereby an energy supplier 123 is permitted to at least partially remotely control some settings of thermostats 120. For example, energy supplier 123 may be able to affect a setpoint of thermostat 120 or may be able to control a relay of thermostat 120, which permits energy supplier 123 to shutdown certain portions of one or more conditioning units 118. Thermostats 120 may be controlled individually, in multiple groups or as a single group. In the example embodiment, thermostat 120 includes at least one processor 119 communicatively coupled to at least one memory device 121. A load shedding event recovery controller 122 may be embodied in a hardware device or may be embodied in software executable on at least one processor 119 or a processor associated with the hardware embodiment of load shedding event recovery controller 122.

During operation, energy supplier 123 may transmit or otherwise convey a load shedding command to one or more thermostats 120, groups of thermostats 120, or combinations thereof. The load shedding command will control a certain aspect of the one or more thermostats 120, such that a load on energy supplier 123 supply assets, for example, generation assets 126 and/or transmission assets 128 is reduced for a duration of a load shedding event. In some embodiments, the load shedding command includes an expiration time, at which time the control of one or more thermostats 120, groups of thermostats 120, or combinations thereof by energy supplier 123 will returned to the single rate-paying entity automatically. In other embodiments, the load shedding command may be rescinded by energy supplier 123 conveying a load shedding recovery command.

When the load shedding command expires or the load shedding recovery command is received, if not controlled, for example, by their respective thermostat 120, all of one or more conditioning units 118 normally tend to come online immediately at the same time because of built up cooling demand during the load shedding event. To avoid such a scenario, one or more thermostats 120 include controls to stagger the restarting of the one or more conditioning units 118. However, because in this embodiment, multi-thermostat temperature control system 100 is not centrally controlled, there is no communication from each thermostat 120 relaying its current state. Therefore, staggering the start of the one or more conditioning units 118 is a function of each of one or more thermostats 120 individually and independent of each other of the one or more thermostats 120.

Figure 2:
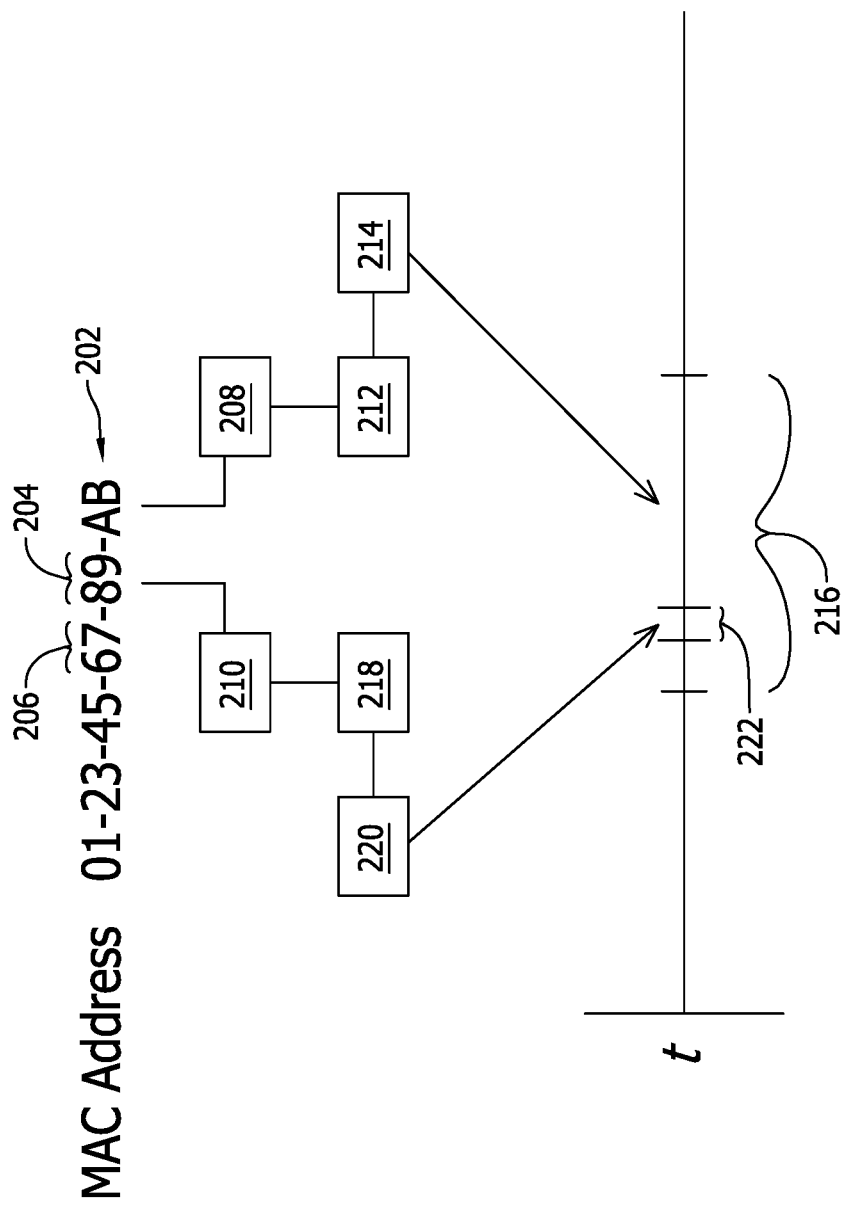
FIG. 2 is an illustration of a method of generating a starting time window for one or more conditioning units in accordance with an example embodiment.

FIG. 2 is an illustration of a method of generating a starting time window for one or more conditioning units 118 in accordance with an example embodiment of the present disclosure. A method that provides for purely random delays may still allow overlap. In the example embodiment, a demand management/avoidance method applicable to medium scale buildings and systems randomly distributed on a power grid does not require real-time communication with or real-time control over thermostats 120. Thermostats 120 perform their demand avoidance functionality autonomously based on firmware and in some cases stored parameters communicated to each thermostat 120.

In the example embodiment, demand avoidance is accomplished by pseudo-randomly dithering start times from the schedule. The randomization is based on some value unique to each thermostat 120, such as, but not limited to, the Media Access Control (MAC) address 202 of thermostat 120. The dithering is quantified to a specific time window, which may be viewed as a time wheel.

For example, based on the least significant two positions (octet), referred to as a least significant octet (LSO) 204 of MAC address 202, a mathematical, logical, or other operation 208, such as, but not limited to modulo 64 is performed, yielding a value of 0 to 63. The same is done for the second two places of MAC address 202, referred to as a second significant octet (SSO) 206. The value from LSO 204 is multiplied 212 by a first window time value 214 to establish a primary delay window 216. The value from SSO 206 is multiplied 218 by a second window time value 220 to establish a dither or secondary delay window 222 within primary delay window 216 to minimize coincidence in large pools of thermostats 120. In various embodiments, a smaller first window time value 214 provides better results, in other words, less overlap between starting times. In some embodiments, first window time value 214 was determined by modeling to be optimum at approximately eleven seconds, second window time value 220 was determined by modeling to be optimum at approximately two seconds. These values yielded a maximum delay of less than fourteen minutes and a peak reduction ration of 1:0.048 for a pool of approximately 8000 thermostats 120. Results are less dramatic for smaller pools, for a 24 conditioning unit 118 system the peak demand ratio is 1:0.14 simply because the original peak is not as large.

Figure 3:
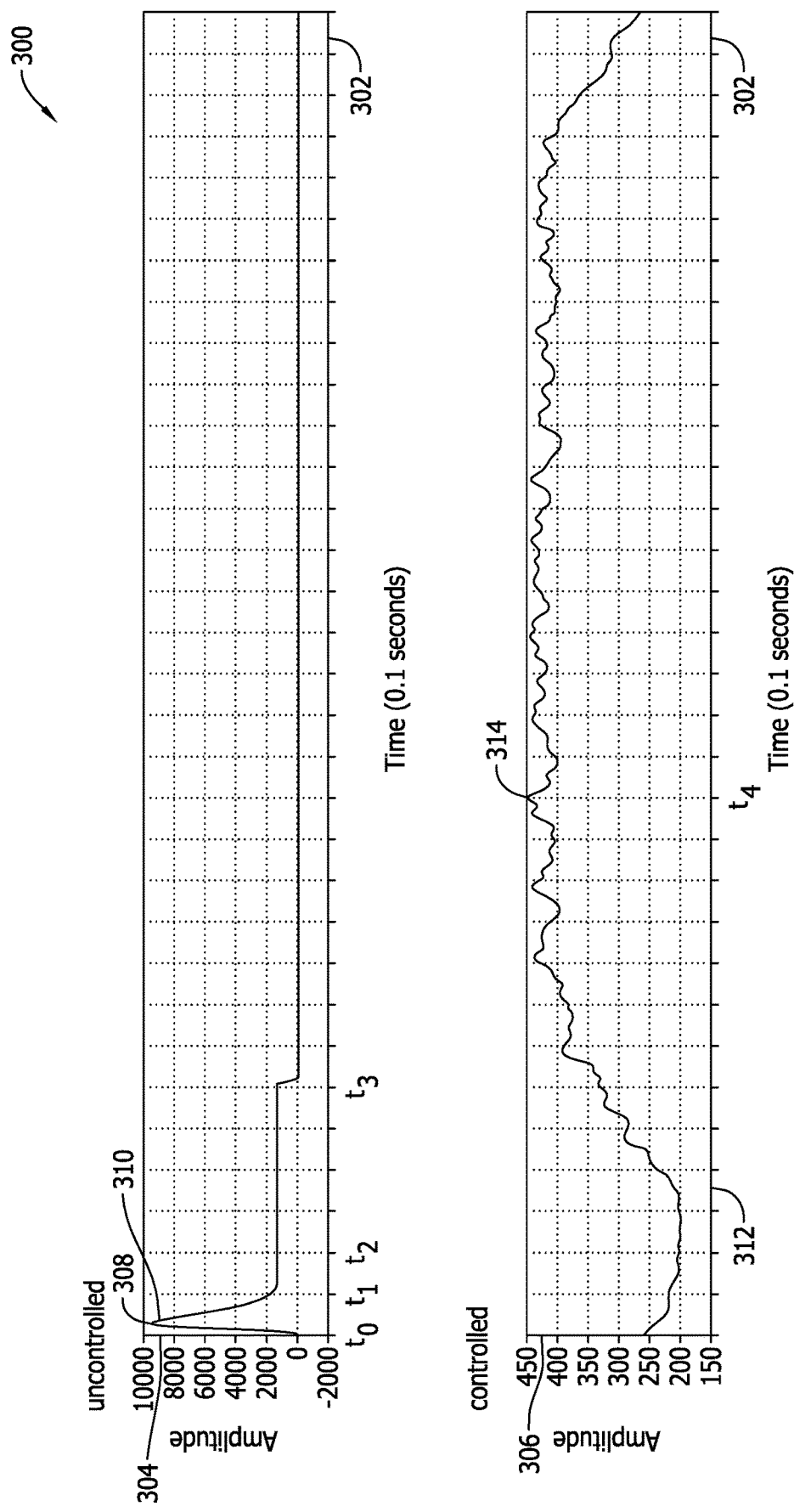
FIG. 3 is a graph of demand of a large pool of thermostats in an uncontrolled state and in a state where the starting time of thermostats is determined by a load shedding recovery method in accordance with an example embodiment.

FIG. 3 is a graph 300 of demand of a large pool of approximately 8,000 thermostats 120 in an uncontrolled state and in a state where the starting time of thermostats 120 is determined by a load shedding recovery method in accordance with an example embodiment. In the example embodiment, graph 300 includes an x-axis 302 graduated in units of time and respective y-axes 304, 306 graduated differently from each other in units of amplitude. A trace 308 indicates values of current, power, or other indicator of load, on the electrical supply system over time, in the uncontrolled state. A peak amplitude 310 occurs at $t_1$, which is approximately nine seconds after $t_0$. Trace 308 reaches a peak value of approximately 9,547 at $t_1$. As the starting currents subside, trace 308 decays to an amplitude equivalent to approximately 1600 units on y-axis 304 between $t_1$ and $t_2$. Trace 308 steps down at $t_2$ to approximately zero units on y-axis 304. A trace 312 illustrates a change in the system response due to the example method. First, a peak amplitude 314 of trace 312 only reaches approximately 449.0 units on y-axis 306. Peak amplitude 314 occurs much later at $t_4$ or approximately 320 seconds after receipt of the load shedding recovery signal at $t_0$ than in the uncontrolled scenario described with reference to trace 308. This behavior occurs because of the combination of the widely disparate starting times of conditioning units 118 permits a start of one conditioning unit 118 to complete or at least partially complete before another conditioning unit 118 starts. Therefore, the starting times of conditioning unit 118 are staggered, causing the starting current surges to be staggered as well.

Figure 4:
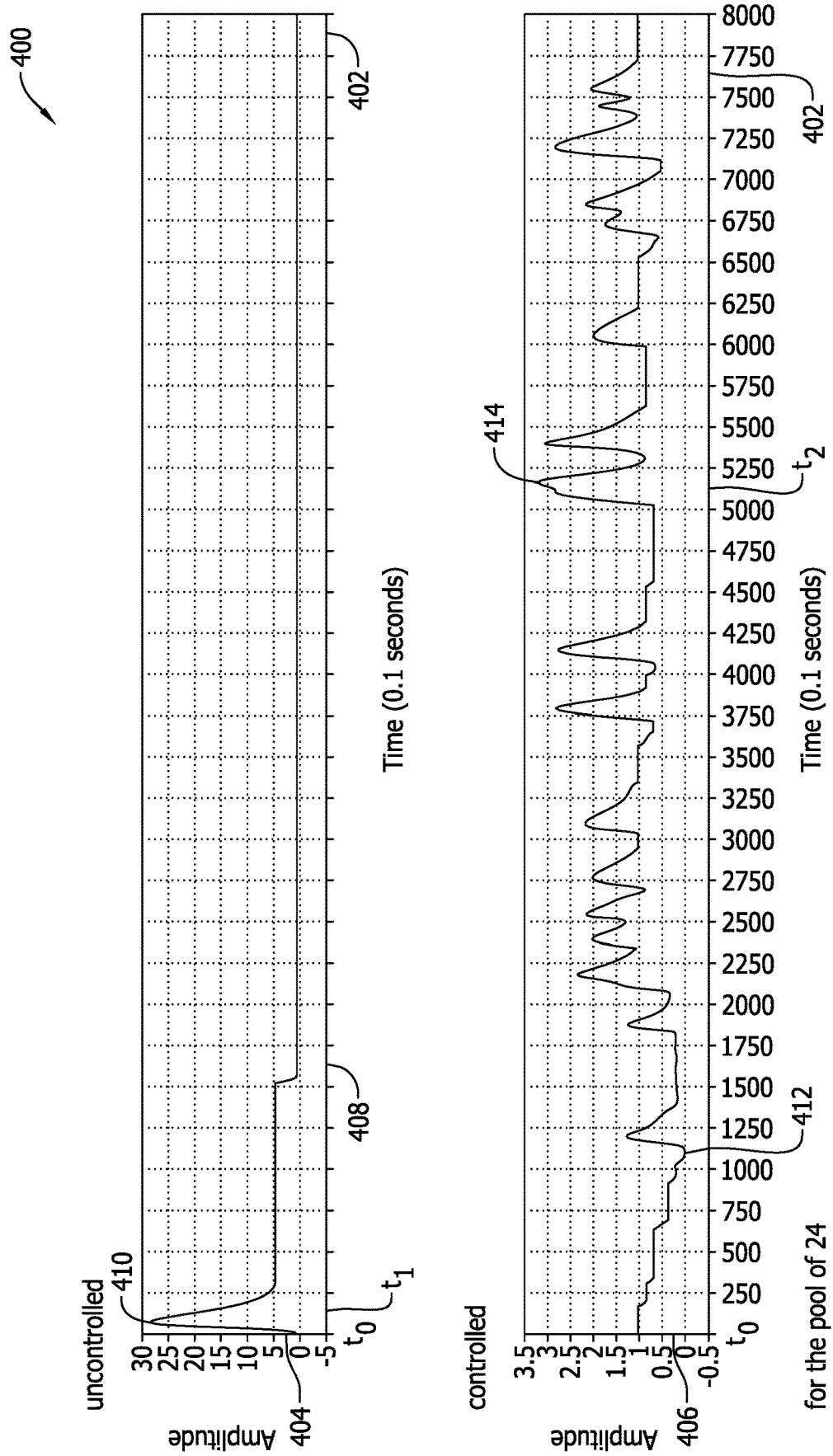
FIG. 4 is a graph similar to the graph shown in FIG. 3 of demand of a small pool of approximately twenty-four thermostats.

FIG. 4 is a graph 400 similar to graph 300, except the number of conditioning units 118 is twenty-four, rather than 8,192 conditioning units 118. In the example embodiment, graph 400 includes an x-axis 402 graduated in units of time and respective y-axes 404, 406 graduated differently from each other in units of amplitude. A trace 408 indicates values of current, power, or other indictor of load on the electrical supply system over time in the uncontrolled state. A peak amplitude 410 occurs at $t_1$, which is approximately nine seconds after $t_0$. Trace 408 reaches a peak value of approximately 27.6 units at $t_1$. A trace 412 illustrates a change in the twenty-four conditioning unit 118 system response due to the method of the present disclosure. A peak amplitude 414 of trace 412 only reaches approximately 3.2 units on y-axis 306. Peak amplitude 414 occurs at $t_2$ or approximately 510 seconds after receipt of the load shedding recovery signal at $t_0$ than in the uncontrolled scenario described with reference to trace 408. A peak demand ratio of 1:0.12 is achieved in this embodiment.

FIGS. 5-10 are graphs of responses that illustrate an effect of different parameter considerations for multi-thermostat temperature control system 100 having different numbers of conditioning units 118.

Figure 5:
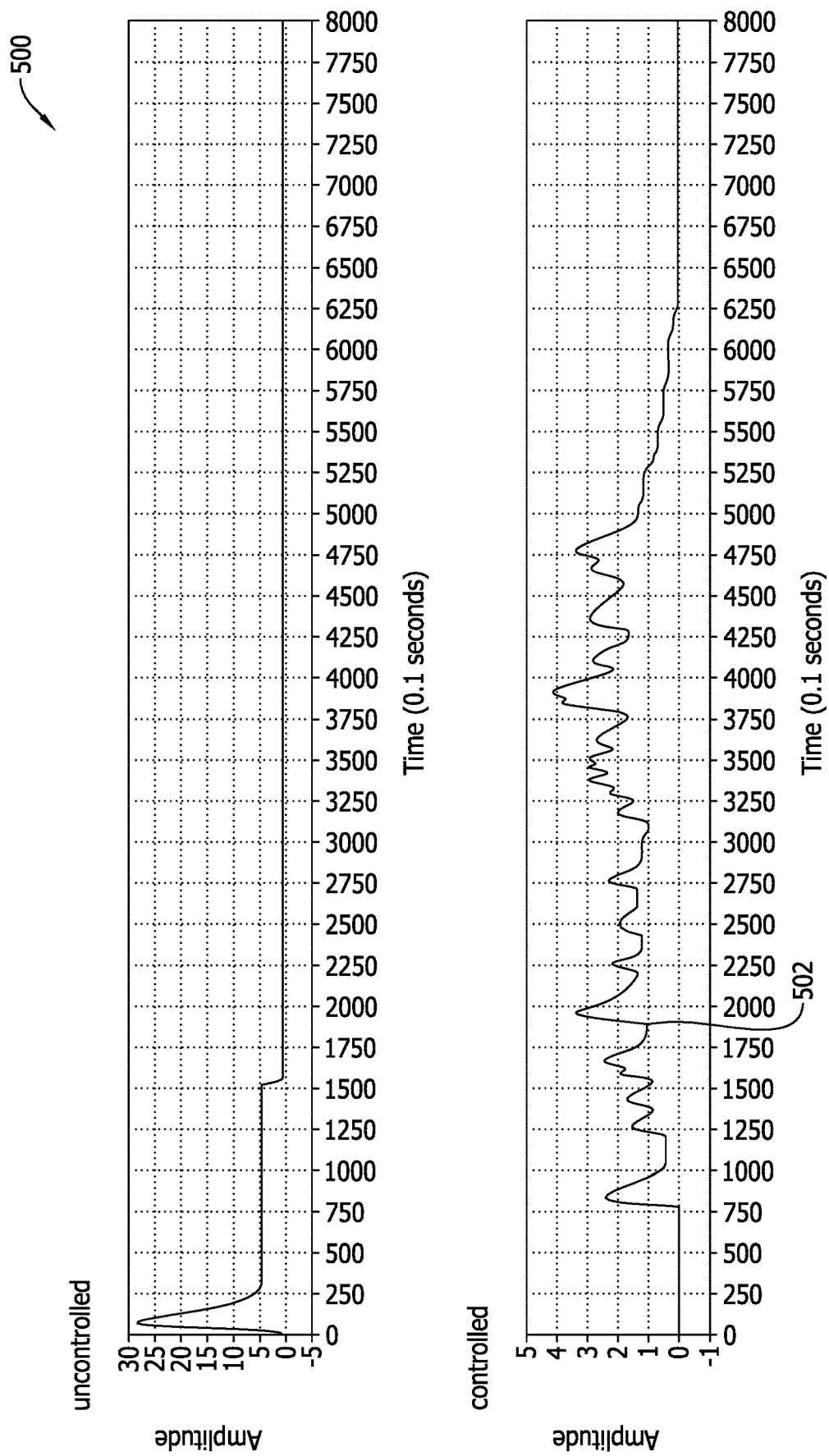
FIG. 5 illustrates a graph having a trace of a twenty-four conditioning unit system response that shows the effect of a first window time value selected to be approximately seven seconds and a second window time value selected to be approximately one second.

FIG. 5 is a graph 500 having a trace 502 of a twenty-four conditioning unit 118 system response that shows the effect of a first window time value 214 selected to be approximately seven seconds and a second window time value 220 selected to be one second. In the example embodiment, a peak demand ratio of 1:0.14 is achieved.

Figure 6:
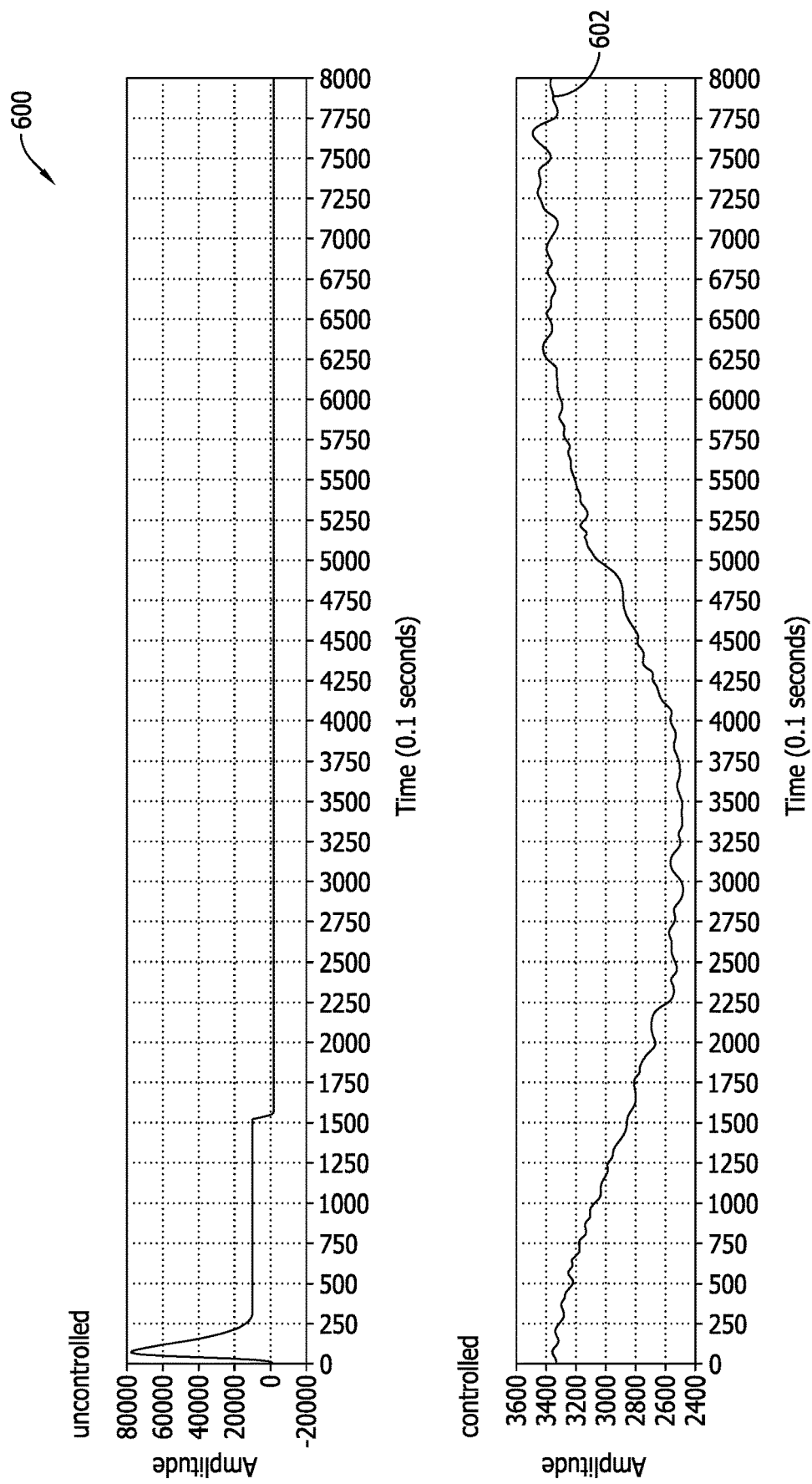
FIG. 6 illustrates a graph having a trace of the system response of an approximately 66,000 conditioning unit system that shows the effect of the environmental parameter adjustment to at least some of thermostats.

FIG. 6 is a graph 600 having a trace 602 of the system response of a 65,536 conditioning unit 118 system that shows the effect of the environmental parameter adjustment to at least some of thermostats 120. It is believed that the large number of conditioning units 118 cause trace 602 to be smoother than traces 312, 412, and 502. Additionally, the start times of the adjusted thermostats 120 cause a pronounced relatively higher amplitude in trace 602 prior to approximately 250 seconds, which tapers off to a relatively low value between 250 seconds and 400 seconds when the unadjusted conditioning units 118 and associated thermostats 120 begin coming online. In the example embodiment, a peak demand ratio of 1:0.05 is achieved.

Figure 7:
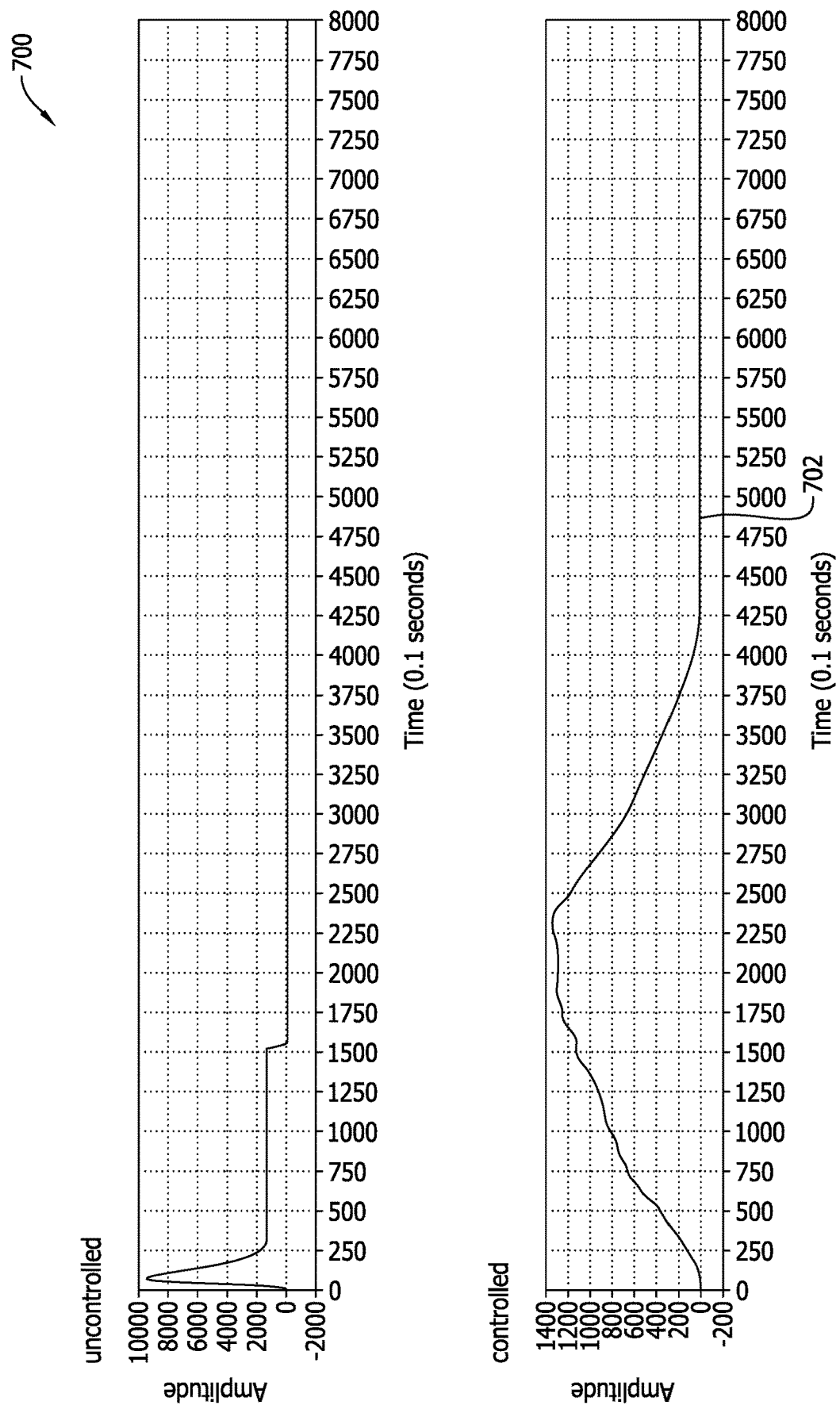
FIG. 7 illustrates a graph having a trace of the system response of the large pool conditioning unit system similar to that illustrated in FIG. 3.

FIG. 7 is a graph 700 having a trace 702 of the system response of the 8,192 conditioning unit 118 system similar to that in FIG. 3. In the example embodiment of FIG. 7, more customer comfort-friendly first window time value 214 and second window time value 220 of 3.5 seconds and one second, respectively, are used to achieve a maximum delay of less than five minutes. First window time value 214 of 3.5 seconds and second window time value 220 of one second are considered more consumer comfort-friendly because these settings can bring all conditioning unit 118 online in less than five minutes, which permits a greater level of comfort for the occupants of the associated conditioned zones 108. In the example embodiment, a peak demand ratio of 1:0.14 is achieved.

Figure 8:
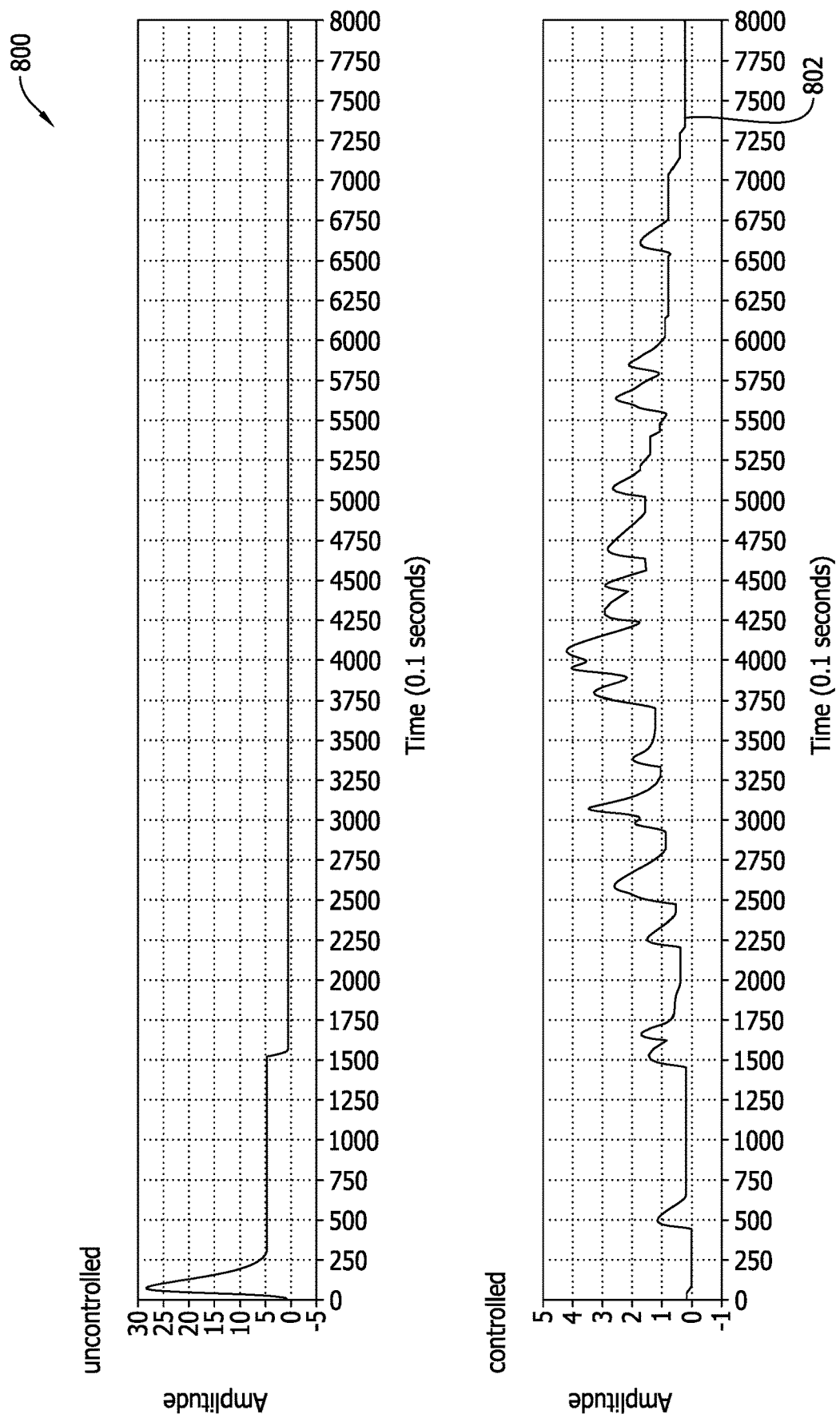
FIG. 8 illustrates a graph having a trace of the system response of a twenty-four conditioning unit system that shows the effect of an adjustment of the starting position of thermostat based on a "condition score" or "merit"

FIG. 8 is a graph 800 having a trace 802 of the system response of a 24 conditioning unit 118 system that shows the effect of an adjustment of the starting position of thermostat 120 based on a "condition score" or "merit" relative to an environmental parameter such as, one or more of temperature, humidity, and enthalpy to provide a sooner start to conditioning units 118 of systems farther from a comfortable state. The "comfortable state" referring to environmental conditions in conditioned zones 108 that make the conditioned zones 108 comfortable for human inhabitants, which may be a subjective determination or may be set by a standard. In various embodiments, a learned response time is an added bias condition. This adjustment occurs without knowledge of the state of the conditions of any other of the plurality of thermostats 120. Because each system is unaware of any other, the start ordering is "noisy", but still biases the conditioning unit 118 system that are furthest from the comfortable state toward the front of the start order. In this embodiment, a condition score is generated and applied to the start timing of the conditioning units 118. Also in this embodiment, first window time value 214 is selected to be eleven seconds and second window time value 220 is selected to be approximately two seconds. In the example embodiment, a peak demand ratio of 1:0.14 is achieved.

Figure 9:
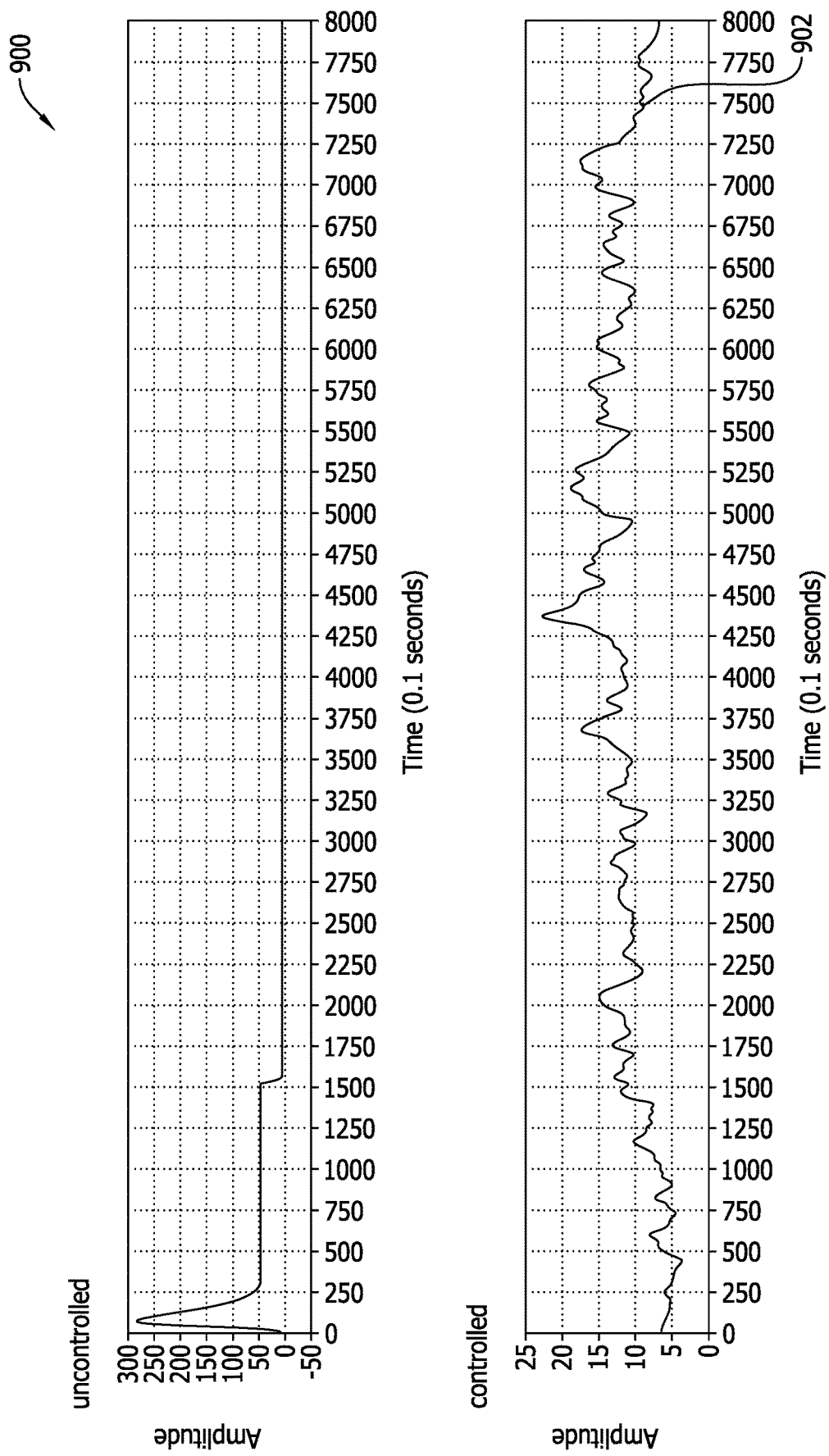
FIG. 9 illustrates a graph having a trace of a 256 conditioning unit system response.

FIG. 9 is a graph 900 having a trace 902 of a 256 conditioning unit 118 system response. FIG. 9 illustrates a condition with no adjustment based on the condition score. In some embodiments, a temperature value and/or enthalpy value is used as the value unique to each thermostat 120. The current temperature reading of thermostat 120 may replace least significant octet (LSO) 204 of MAC address 202 to determine primary delay window 216 and a calculated enthalpy may replace second significant octet (SSO) 206 to determine secondary delay window 222. In the example embodiment, a peak demand ratio of 1:0.082 is achieved.

Figure 10:
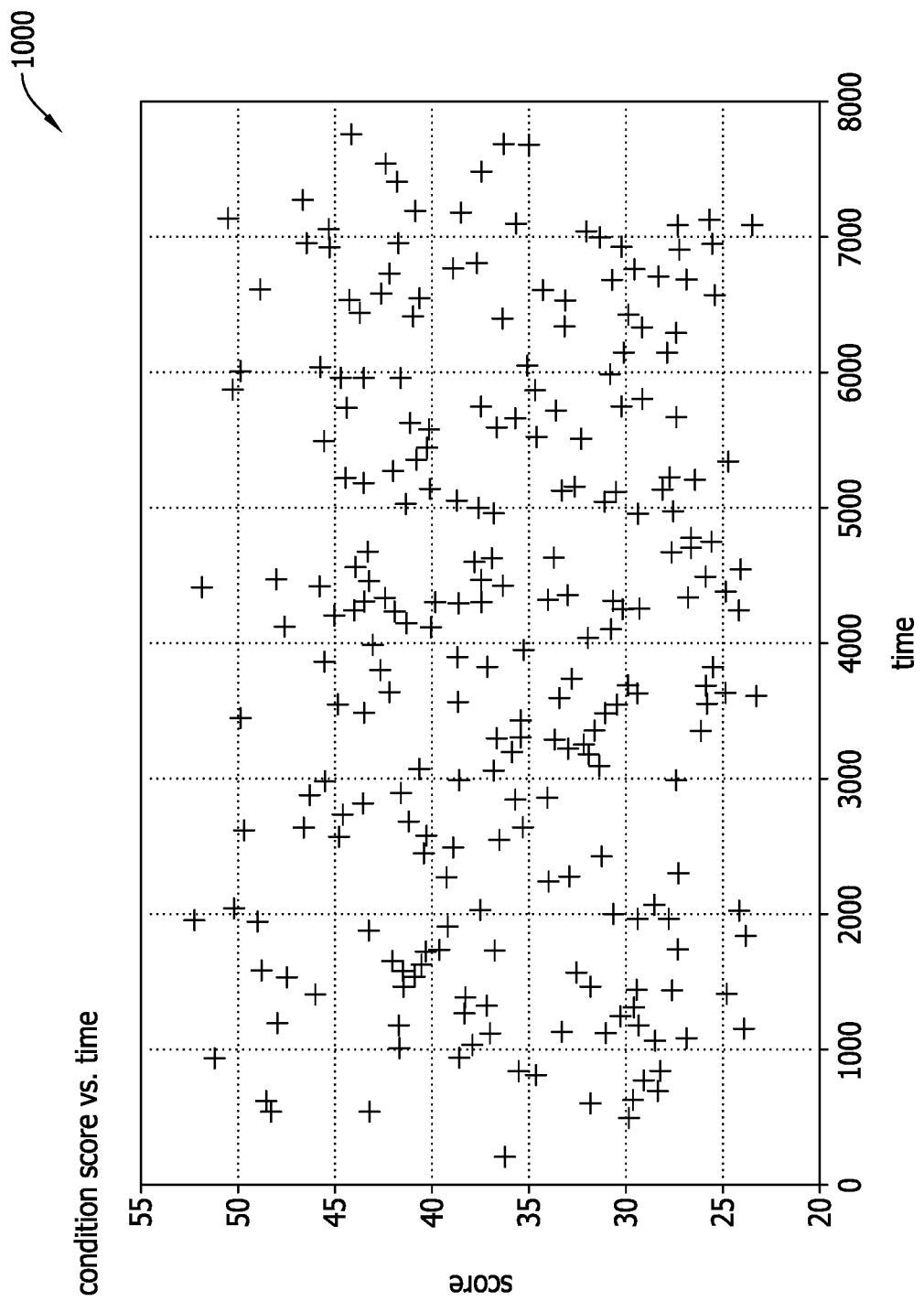
FIG. 10 illustrates a graph of condition score versus time for the 256 conditioning unit system shown in FIG. 9.

FIG. 10 illustrates a graph 1000 of condition score versus time for the 256 conditioning unit 118 system shown in FIG. 9. FIG. 10 illustrates a distribution of starting times when the adjustment of the condition score is not applied. Without the adjustment, the starting times are plotted as a relatively even distribution regardless of the score. As described above, the condition score is determined from local environmental parameters available to thermostat 120. The local environmental parameters are used to determine which thermostat 120 should be moved up in terms of load shedding recovery starting time. The local environmental parameters used could be based on a deviation of the temperature sensed by thermostat 120 from the current setpoint exceeding a predetermined threshold. The local environmental parameters used could also be based on a humidity level in an associated conditioned zone 108. The local environmental parameters used could also be based on an occupancy of the associated conditioned zones 108. Any local environmental parameters that thermostat 120 has access to may be used to adjust the starting time of that thermostat 120 and associated conditioning unit 118 system.

Figure 11:
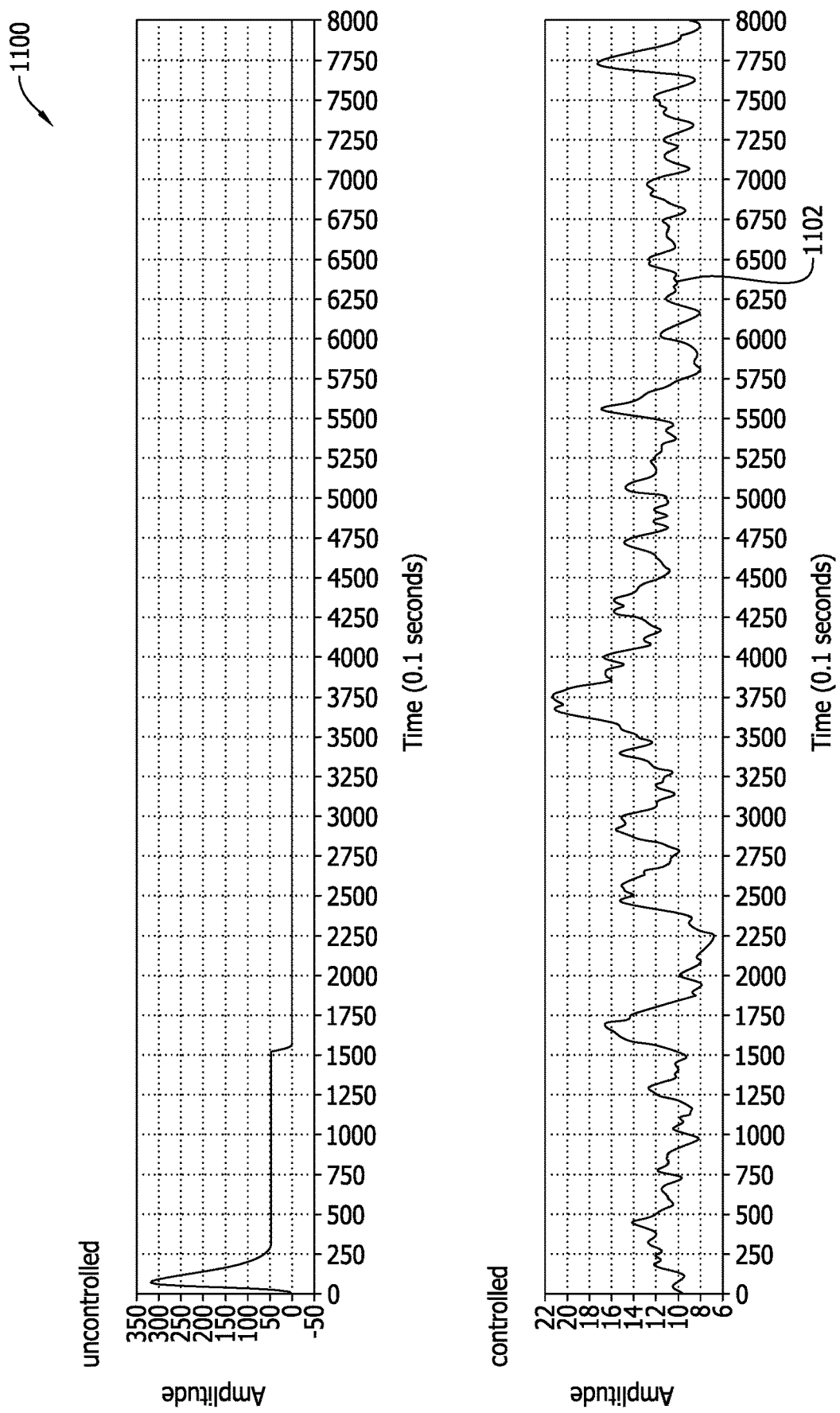
FIG. 11 illustrates a graph having a trace of the system response of the 256 conditioning unit system shown in FIG. 9 that shows the effect of the environmental parameter adjustment to at least some of thermostats.

FIG. 11 illustrates a graph 1100 having a trace 1102 of the system response of the 256 conditioning unit 118 system (shown in FIG. 9) that shows the effect of the environmental parameter adjustment to at least some of thermostats 120. As can be seen in a visual comparison of traces 902 and 1102, amplitudes in the first 400 seconds are higher in trace 1102 than in trace 602. The higher amplitudes are indicative of the starting of conditioning unit 118 earlier in the recovery. In the example embodiment, a peak demand ratio of 1:0.07 is achieved.

Figure 12:
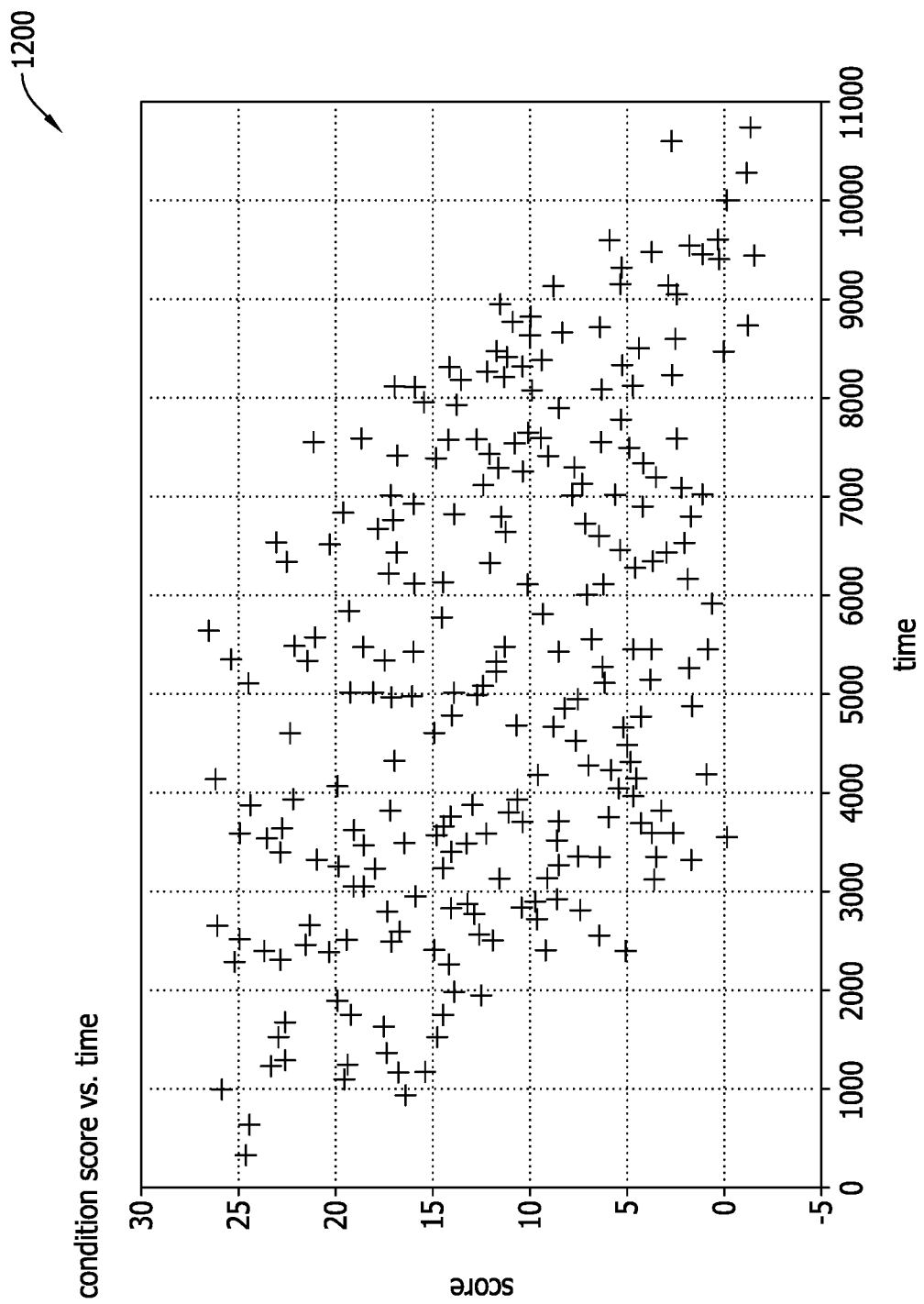
FIG. 12 illustrates a graph of condition score versus time for the 256 conditioning unit system shown in FIG. 9.

FIG. 12 illustrates a graph 1200 of condition score versus time for the 256 conditioning unit 118 system shown in FIG. 9. FIG. 10 illustrates a distribution of starting times when the adjustment of the condition score is not applied. FIG. 12 illustrates a distribution of starting times when the adjustment of the condition score is applied. Without the adjustment, the starting times are plotted as a fairly even distribution regardless of the score. With the adjustment, the starting times as plotted have a markedly parallelogram-shape distribution with higher scored starting times moved toward the y-axis, meaning they start earlier than lower-scored starting times. As described above, the condition score is determined from local environmental parameters available to thermostat 120.

Figure 13:
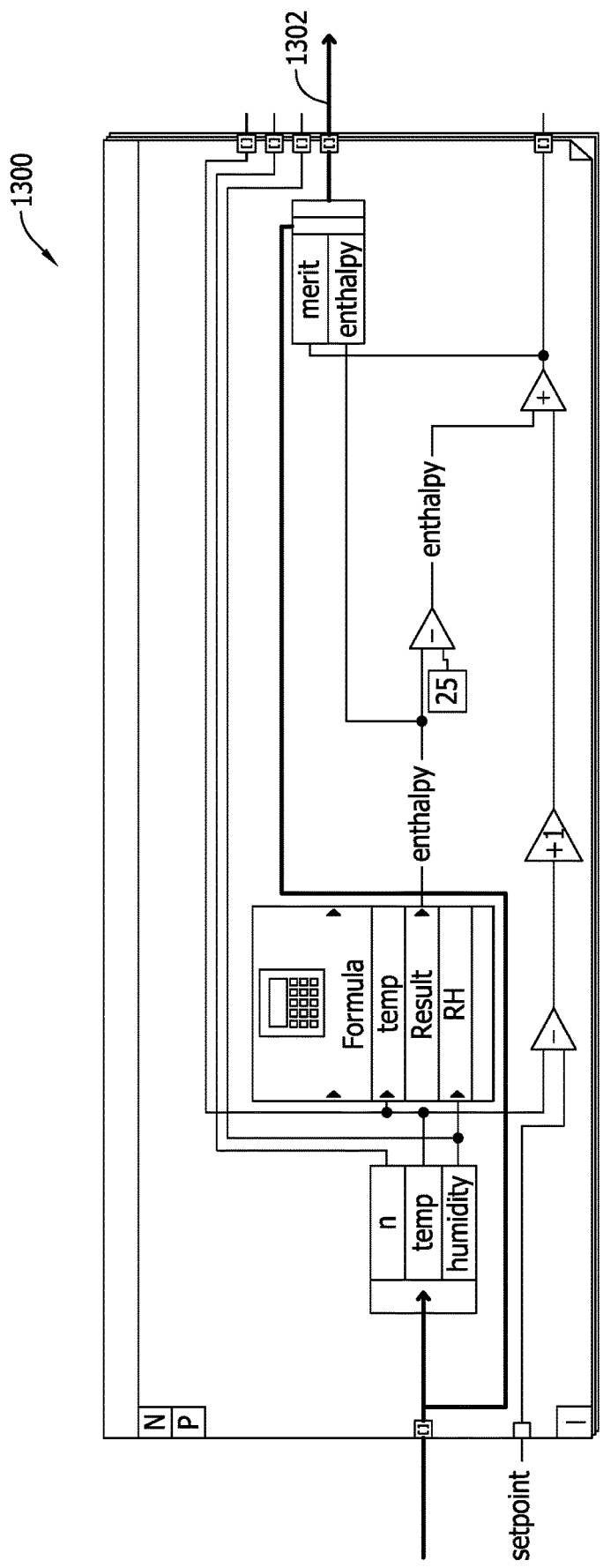
FIG. 13 is a control diagram of a condition score calculator that may be used with the multi-thermostat temperature control system shown in FIG. 1.

FIG. 13 is a control diagram of a condition score calculator 1300 that may be used with the multi-thermostat temperature control system 100 (shown in FIG. 1). In the example embodiment, thermostat 120 uses temperature and humidity to determine enthalpy of the air in one or more conditioned rooms 116 and/or zones 108 associated with that thermostat 120. Enthalpy may be used to determine the condition score 1302 for that thermostat 120. The enthalpy of the air in the associated one or more conditioned rooms 116 and/or zones 108 influences the comfort sensation in the one or more conditioned rooms 116 and/or zones 108. Moist air is a mixture of dry air and water vapor. In atmospheric air, water vapor content may vary from approximately zero percent to three percent by mass. The enthalpy of moist and humid air includes the enthalpy of the dry air, also referred to as the sensible heat and the enthalpy of the evaporated water in the air, also referred to the latent heat. In the example embodiment, thermostat 120 uses the total enthalpy, both the sensible and latent enthalpies when calculating the condition score or merit. The specific enthalpy of moist air can be expressed as:

$$h=h_a+xh_w \quad (1)$$

where
h=specific enthalpy of moist air
$h_a$=specific enthalpy of dry air
x=humidity ratio
$h_w$=specific enthalpy of water vapor
The specific enthalpy of dry air can be expressed as:

$$h_a=c_{pa}t \quad (2)$$

where
$c_{pa}$=specific heat of air at constant pressure
t=air temperature
The specific enthalpy of water vapor can be expressed as:

$$h_w=c_{pw}t+h_{we} \quad (3)$$

where
$c_{pw}$=specific heat of water vapor at constant pressure
t=water vapor temperature
$h_{we}$=evaporation heat of water
The latent heat due to evaporation of water is the major part of the enthalpy. In various embodiments, the sensible heat due to heating evaporated water vapor is neglected.

Figure 14:
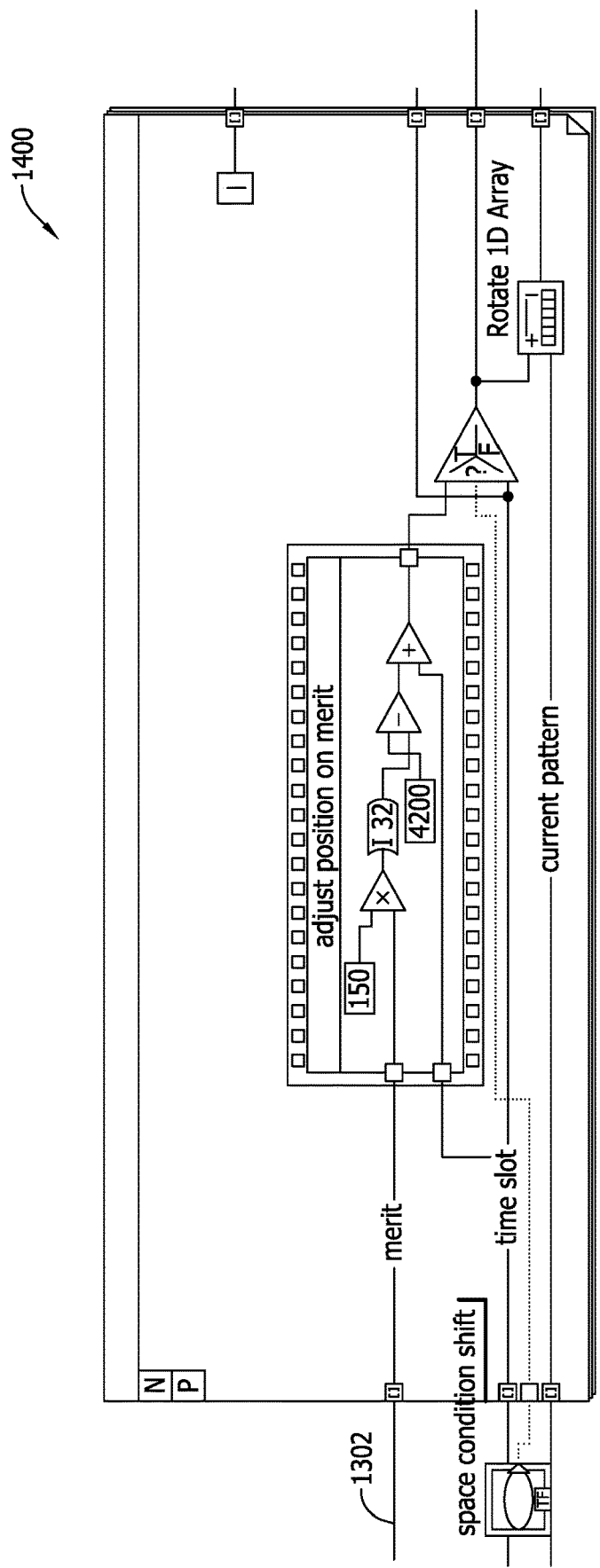
FIG. 14 is a control diagram of a condition score shifter of thermostat.

FIG. 14 is a control diagram of a condition score shifter 1400 of thermostat 120. In the example embodiment, the calculated condition score 1302 is received from condition score calculator 1300 (shown in FIG. 13). In one embodiment, thermostat 120 may calculate a starting time independent of received condition score 1302. Thermostat 120 may then apply condition score 1302 to the calculated starting time. In another embodiment, thermostat 120 may calculate the starting time using the received condition score 1302 to modify one or both of first window time value 214 and second window time value 220, which would influence the size and position of primary delay window 216 and/or secondary delay window 222. In other embodiments, thermostat 120 may adjust the size and/or position of primary delay window 216 and/or secondary delay window 222 directly using condition score 1302.

Figure 15:
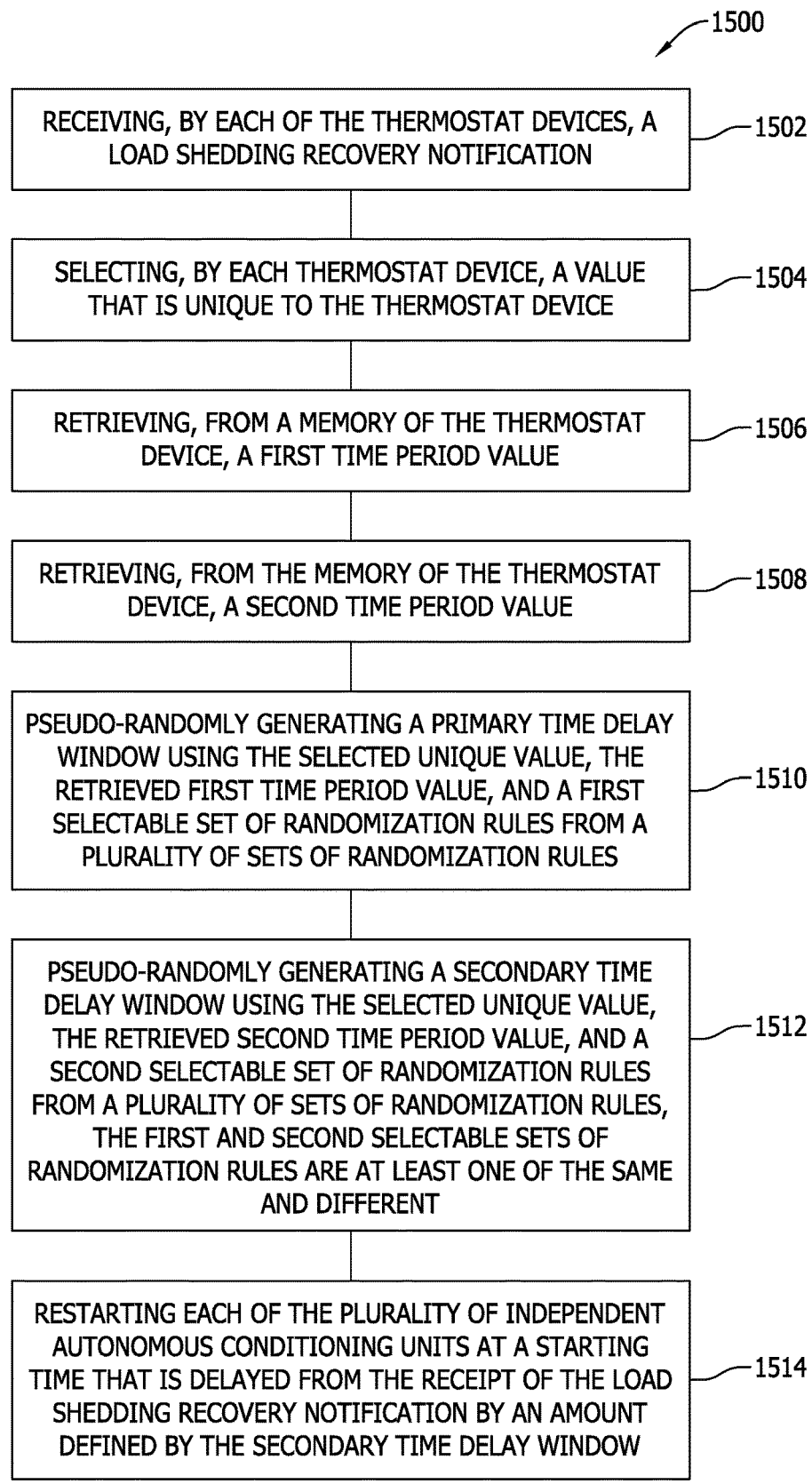
FIG. 15 is a flow diagram of a method of managing a recovery of a plurality of independent autonomous conditioning units from a load shedding event.

FIG. 15 is a flow diagram of a method 1500 of managing a recovery of a plurality of independent autonomous conditioning units from a load shedding event. The plurality of independent autonomous conditioning units each include a respective thermostat device controlling an environment of a respective conditioned zone. In the example embodiment, method 1500 includes receiving 1502, by each of the thermostat devices, a load shedding recovery notification, which may be transmitted directly from an energy supply entity that initiated the load shedding or may be received from a local entity or controller that can relay the load shedding recovery notification. Method 1500 also includes selecting 1504, by each thermostat device, a value that is unique to the thermostat device. The value may be a value stored in a memory location, such as, in the case of a static value or a location of the value may be pointed to or addressed by the value stored, such as, with an address in memory or URL where a dynamic value is routinely updated. Method 1500 further includes retrieving 1506, from a memory of the thermostat device, a first time period value, retrieving 1508, from the memory of the thermostat device, a second time period value, and pseudo-randomly generating 1510 a primary time delay window using the selected unique value, the retrieved first time period value, and a first selectable set of randomization rules from a plurality of sets of randomization rules. The plurality of sets of randomization rules may be the same for all thermostats or some thermostats may include different sets of randomization rules than other thermostats. Having different sets of randomization rules to select from decreases the likelihood of the thermostats determining identical starting times. Method 1500 also includes pseudo-randomly generating 1512 a secondary time delay window within the primary time delay window using the selected unique value, the retrieved second time period value, and a second selectable set of randomization rules from a second plurality of sets of randomization rules, the first and second selectable sets of randomization rules may include the same randomization rules or may contain different randomization rules. Method 1500 also includes restarting 1514 each of the plurality of independent autonomous conditioning units at a starting time that is delayed from the receipt of the load shedding recovery notification by an amount defined by the secondary time delay window.

Optionally, method 1500 also includes storing, in a memory of the thermostat device, one or more values that are unique to the thermostat device and/or one or more locations of values that are unique to the thermostat device. To add randomization for each thermostat to have different conditioning unit orders each day, a factor such as temperature or some non-synchronous counter is used.

Method 1500 may also include selecting a value that is at least one of static and dynamic. In various embodiments, a static value is a value associated with the thermostat that is predetermined, such as, but not limited to a serial number, a MAC address, a physical location of the thermostat by coordinates, or combinations thereof or other values that do not routinely change. In other embodiments, a dynamic value is one that is regularly updated, for example, but not limited to a temperature reading, a humidity reading, an occupancy detection, or combinations thereof. Method 1500 also optionally includes determining a condition score for at least some of the conditioned zones based on an environmental parameter detected by the thermostat associated with that conditioned zone and adjusting the starting time of at least some of the plurality of independent autonomous conditioning units using the respective condition score.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 119 and by devices that include, without limitation, mobile devices, clusters, personal computers, workstations, clients, and servers, including RAM memory, ROM memory, EPROM memory, EEPROM memory, and non-volatile RAM (NVRAM) memory. The above memory types are examples only, and are thus not limiting as to the types of memory usable for storage of a computer program.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving, by each of the thermostat devices, a load shedding recovery notification, (b) selecting, by each thermostat device, a value that is unique to the thermostat device, (c) retrieving, from a memory of the thermostat device, a first time period value, (d) retrieving, from the memory of the thermostat device, a second time period value, (e) pseudo-randomly generating a primary time delay window using the selected unique value, the retrieved first time period value, and a first selectable set of randomization rules from a plurality of sets of randomization rules, (f) pseudo-randomly generating a secondary time delay window within the primary time delay window using the selected unique value, the retrieved second time period value, and a second selectable set of randomization rules from a plurality of sets of randomization rules, the first and second selectable sets of randomization rules are at least one of the same and different, and (g) restarting each of the plurality of independent autonomous conditioning units at a starting time that is delayed from the receipt of the load shedding recovery notification by an amount defined by the secondary time delay window. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link, including a cloud computing and/or storage environment. The article of manufacture containing the computer code may be made and/or used by executing the code directly from one medium, by copying the code from one medium to another medium, or by transmitting the code over a network.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermostat for a multi-thermostat temperature control system comprising:
   a load shedding event recovery controller comprising at least one processor communicatively coupled to at least one memory device, the load shedding event recovery controller configured to:
   receive one or more input signal commands permitting a recovery from a demand management system load shedding event;
   determine a pseudo-random starting time window from which a recovery starting time is selected, the pseudo-random starting time window based on a value accessible to the thermostat and unique to the thermostat, the pseudo-random starting time window including a primary delay window and a secondary delay window within the primary delay window; and
   start an operation of a conditioning unit associated with the thermostat at the selected recovery starting time.

2. The thermostat of claim 1, wherein the pseudo-random starting time window is based on a Media Access Control (MAC) address of the thermostat.

3. The thermostat of claim 1, wherein the primary delay window comprises a selectable time period and a pseudo-random starting time and a pseudo-random ending time.

4. The thermostat of claim 3, wherein the primary delay window comprises a pseudo-random delay time and a selectable time period about the pseudo random delay time.

5. The thermostat of claim 1, wherein the load shedding event recovery controller is further configured to determine a condition score based on an environmental parameter accessible to the thermostat to provide a sooner starting time for conditioning units associated with conditioned spaces that are determined to be outside a predetermined comfortable state.

6. The thermostat of claim 5, wherein the load shedding event recovery controller is further configured to adjust a starting position of the thermostat based on the determined condition score.

7. The thermostat of claim 5, wherein the environmental parameter includes at least one of temperature, humidity, and enthalpy.

8. A method of managing a recovery of a plurality of independent autonomous conditioning units from a load shedding event, the plurality of independent autonomous conditioning units each comprising a respective thermostat device controlling an environment of a respective conditioned zone, said method comprising:
   receiving, by each of the thermostat devices, a load shedding recovery notification;
   selecting, by each thermostat device, a value that is unique to the thermostat device;
   retrieving, from a memory of the thermostat device, a first time period value;
   retrieving, from the memory of the thermostat device, a second time period value;
   pseudo-randomly generating a primary time delay window using the selected unique value, the retrieved first time period value, and a first selectable set of randomization rules from a plurality of sets of randomization rules;
   pseudo-randomly generating a secondary time delay window within the primary time delay window using the selected unique value, the retrieved second time period value, and a second selectable set of randomization rules from a plurality of sets of randomization rules, the first and second selectable sets of randomization rules are at least one of the same and different; and
   restarting each of the plurality of independent autonomous conditioning units at a starting time that is delayed from the receipt of the load shedding recovery notification by an amount defined by the secondary time delay window.

9. The method of claim 8, further comprising storing, in a memory of the thermostat device, one or more values that are unique to the thermostat device.

10. The method of claim 8, further comprising storing, in a memory of the thermostat device, one or more locations of values that are unique to the thermostat device.

11. The method of claim 8, wherein selecting a value that is unique to the thermostat device comprises selecting a value that is at least one of static and dynamic.

12. The method of claim 8, further comprising:
determining a condition score for at least some of the conditioned zones based on an environmental parameter detected by the thermostat associated with that conditioned zone; and
adjusting the starting time of at least some of the plurality of independent autonomous conditioning units using the respective condition score.

13. A temperature control system comprising:
a plurality of independent autonomous thermostats, each thermostat comprising at least one processor communicatively coupled to at least one memory device, the plurality of independent autonomous thermostats configured to:
receive one or more input signal commands permitting a recovery from a demand management system load shedding event;
determine, by each of the plurality of independent autonomous thermostats, a pseudo-random starting time window from which a recovery starting time for that thermostat is selected, the pseudo-random starting time window based on a value accessible to the thermostat that is unique to the thermostat, the starting time window comprising a primary delay window and a secondary delay window within the primary delay window; and
start an operation of a conditioning unit associated with the thermostat at the selected recovery starting time.

14. The temperature control system of claim 13, wherein the pseudo-random starting time window is based on a Media Access Control (MAC) address of the thermostat.

15. The temperature control system of claim 13, wherein the primary delay window comprises a selectable time period and a pseudo-random starting time and a pseudo-random ending time.

16. The temperature control system of claim 15, wherein the primary delay window comprises a pseudo-random delay time and a selectable time period about the pseudo random delay time.

17. The temperature control system of claim 13, wherein the thermostat is further configured to determine a condition score based on an environmental parameter accessible to the thermostat to provide a sooner starting time for conditioning units associated with conditioned spaces that are determined to be outside a predetermined comfortable state.

18. The temperature control system of claim 17, wherein the thermostat is further configured to adjust a starting position of the thermostat based on the determined condition score.

19. The temperature control system of claim 17, wherein the environmental parameter includes at least one of temperature, humidity, and enthalpy.

\* \* \* \* \*